United States Patent

Fujii

[11] 4,119,451
[45] Oct. 10, 1978

[54] METHOD OF PRESS-FORMING CORRUGATED PAPERBOARD AS SUBSTRATE OF CURVED TRIM BOARD

[75] Inventor: Toshihiko Fujii, Yokohama, Japan
[73] Assignee: Nissan Motor Company, Ltd., Japan
[21] Appl. No.: 816,275
[22] Filed: Jul. 15, 1977

[30] Foreign Application Priority Data

Jul. 15, 1976 [JP] Japan .................................. 51-84624

[51] Int. Cl.² ........................ B32B 31/20; B32B 31/18
[52] U.S. Cl. .................................. 156/211; 156/220; 156/253
[58] Field of Search ............... 156/211, 196, 198, 207, 156/209, 219, 220, 252, 253

[56] References Cited

U.S. PATENT DOCUMENTS

| | | | |
|---|---|---|---|
| 2,144,544 | 1/1939 | Osborn | 156/210 X |
| 2,503,874 | 4/1950 | Ives | 156/207 |
| 2,616,823 | 11/1952 | Weymouth | 156/252 |
| 2,800,423 | 7/1957 | De Swart | 156/253 |
| 3,627,608 | 12/1971 | Steiner | 156/214 X |

FOREIGN PATENT DOCUMENTS

52-21,082 2/1977 Japan.

*Primary Examiner*—Douglas J. Drummond
*Assistant Examiner*—William H. Thrower

[57] ABSTRACT

In the production of a trim board such as an automobile roof trim board using a corrugated paperboard substrate which is bulged or dented in a comparatively small area and has an aperture in this area for the installation of a separate article, at least one linear notch is formed in a flat board of corrugated paperboard so as to extend transversal to the ridges of the corrugated medium and be entirely included in the area of the aperture as a preparatory procedure to press-forming of the corrugated paperboard. The presence of the notch allows some deformation of a tensioned liner also in the same direction as the ridges and hence precludes the appearance of cracks in the bulged or dented area. The notched region of the shaped board is thoroughly cut away as the result of the formation of the intended aperture.

11 Claims, 9 Drawing Figures

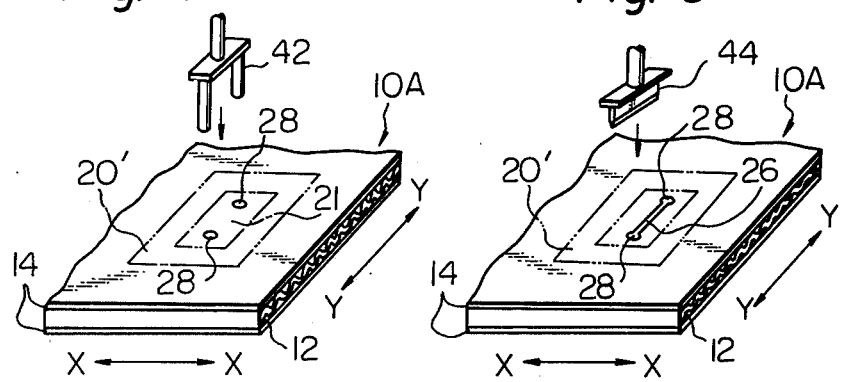

METHOD OF PRESS-FORMING CORRUGATED PAPERBOARD AS SUBSTRATE OF CURVED TRIM BOARD

BACKGROUND OF THE INVENTION

This invention relates to a method of press-forming corrugated paperboard into an at least partly curved board which serves as the substrate of a wall covering material for the interior of cars, ships or buildings. The invention is particularly concerned with the prevention of cracking in relatively deep-drawn areas of the press-formed board.

In the field of wall covering board materials to afford comforts and/or decorative effect to the interior of cars, ships or buildings, corrugated paperboard has recently attracted increasing attention as a basic material because of its light weight, low cost, good heat and sound insulating ability and fairly good adaptability to various mechanical processing. In automobiles, for example, trim boards such as roof trim and door trim boards of corrugated paperboard base have already been in practical use on an industrial scale.

Trim boards of this type usually consist of a substrate of corrugated paperboard and a skin or facing layer which is laid on one side of the substrate for producing protective, decorative and/or cushioning effects. In most cases the corrugated paperboard substrate takes the form of a double-faced board given by bonding liners to both sides of a corrugated medium using a thermoplastic resin as the adhesive. A variety of sheet materials are useful as the facing layer. The useful materials may roughly be classified into woven or nonwoven cloths, soft plastics sheets, artificial leathers and laminated materials given by backing any of these sheet materials with a cushioning layer such as a urethane foam layer. Since walls (including ceiling) to be covered with these trimming boards usually have curved surfaces, the trim boards are produced as at least partly curved boards in conformance with the curved wall surfaces. Press-forming with application of heat is a usual way of producing curved trim boards of corrugate paperboard base. In most cases the substrate alone is formed into a desired shape by means of a hotpress, followed by the application of the facing layer onto the shaped substrate, but sometimes the facing layer is placed on a flat substrate with the interposal of a hot-melt type adhesive layer to accomplish the bonding simultaneously with the shaping of the substrate by heat-pressing.

However, press-forming of the corrugated paperboard substrate has encountered a problem, regardless of the presence or absence of the facing layer at the time of press-forming, originated from the fact that corrugated paperboard inherently lacks ductility. When the substrate is press-formed into a partly or entirely curved board, cracks tend to appear in curved areas particularly on one side which undergoes a larger extent of stretching during press-forming to give a convex surface. The probability of such cracking increases when the substrate is subjected to deep-drawing or made to bulge or dent with comparatively small radii of curvature in a small area where it is intended afterward to make either a bolt hole for fixing the trim board to wall or an aperture for the attachment of a certain instrument, for example a room lamp in the case of an automobile roof trim board.

Usually the aforementioned cracks can be hidden from view when the shaped substrate is laid with the facing layer, but, even though invisible, these cracks tend to grow larger after the application of the trim board to a wall or ceiling which is subject to externally caused vibrations and shocks. Other than the possibility of causing break of the substrate, the presence of cracks in the substrate frequently results in that the outer surface of the facing layer shows visible traces of the cracks since the facing layer is made to have only a small thickness, in most cases about a few millimeters, from the viewpoints of weight and cost. The presence of such traces of course impairs the decorative effect and hence the commertial value of the trim board.

SUMMARY OF THE INVENTION

It is an object of the present invention to solve the above described problem of the occurrence of cracking at press-forming of corrugated paperboard to produce a curved substrate for a trim board.

It is another object of the invention to provide an improved method of producing an at least partly curved board of corrugated paperboard which serves as the substrate of a trim board for application to the interior of cars, ships or buildings and has an aperture formed in a locally bulged or dented area for the installation of a separate article, which method has the advantage that no crack is made in the aforementioned area of the corrugated paperboard substrate.

According to the invention, a corrugated paperboard substrate of a trim board, which substrate has an aperture formed in a locally bulged or dented area for the installation of a separate article, is produced by a method comprising the steps of (a) making at least one linear notch in a flat board of corrugated paperboard to extend transversal to the ridges of the corrugated medium of the board in such a disposition that the notch is entirely included in a relatively small area to subsequently be cut away to form the aforementioned aperture, (b) press-forming the notched board into a desired shape to have a locally bulged or dented area which includes the aforementioned small area, and (c) forming the aforementioned aperture in the bulged or dented area of the shaped board.

When the notched corrugated paperboard is subjected to drawing by pressing, the notch exhibits an enlargement in its width and allows the notched linear of the corrugated paperboard in the notched area to somewhat stretch also in a direction generally parallel to the corrugation. Accordingly drawing of the corrugated paperboard can be accomplished without making crack in the bulged or dented area. Since the notched area is cut away at the subsequent step of forming the required aperture, the provision of the notch has no influence on the quality or appearance of the product.

Each notch is preferably made by initially making two tiny holes with a distance corresponding to the intended length of the notch and then making a linear and slim notch so as to terminate at these holes. This method is effective for precluding the development of any crack from either end of the notch.

It is preferable that the corrugated paperboard as the material of the substrate utilizes a thermoplastic resin as the adhesive for bonding a liner or liners to a corrugated medium. In this case, the press-forming of the notched board is performed with application of heat.

BRIEF DESCRIPTION OF THE DRAWINGS

FIGS. 4 and 5 show a preferred manner of making a notch in corrugated paperboard in a method of the invention;

FIGS. 6a, 6b, and 6c show three different patterns of pluralized notches according to the invention; and FIG. 7 shows the result of a press-forming procedure according to the invention.

DESCRIPTION OF PREFERRED EMBODIMENTS

Figure 1:
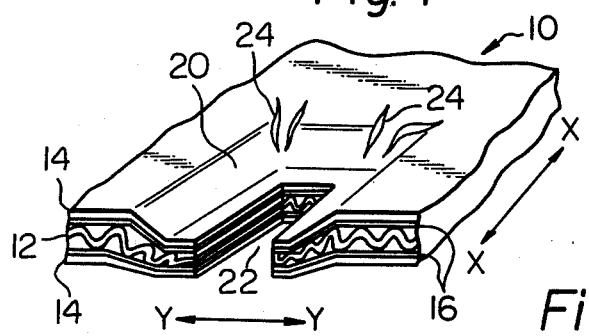
FIG. 1 is a fragmentary and perspective view of a corrugated paperboard substrate to be produced by a method according to the invention.

FIG. 1 shows a partly curved and apertured board 10 of corrugated paperboard which serves as the substrate of an automobile roof trim board. The corrugated paperboard as the material of this board 10 is a double-faced board given by covering both sides of a corrugated medium 12 of paper with liners 14 of paper. In some cases, however, a single-faced board(only one side of a corrugated medium is covered with a liner) is useful as the material of the described substrate. The bonding of the liners 14 to the corrugated medium 12 is achieved by adhesive layers 16 which are initially coated on the inner surfaces of the respective liners 14. Alternatively, both sides of the corrugated medium 12 may initially be coated with thermoplastic resin layers. The material of the adhesive layers 16 is a thermoplastic resin such as polyethylene. The board 10 is crushed and dented(-bulged downwards in FIG. 1) in a relatively small area indicated at 20, and a cut or aperture 22 is formed in this area 20 for the installation of, for example, a room lamp(not shown).

Figure 2:
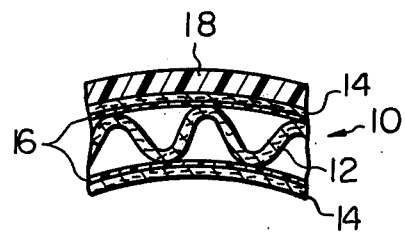
FIG. 2 is a sectional view of a trim board which utilizes the substrate of FIG. 1.

A trim board is given by laying a predetermined one side of the corrugated paperboard substrate 10 with a facing layer 18 as shown in FIG. 2 with the interposal of an adhesive layer(omitted from the illustration) of a hot-melt type.

Figure 3:
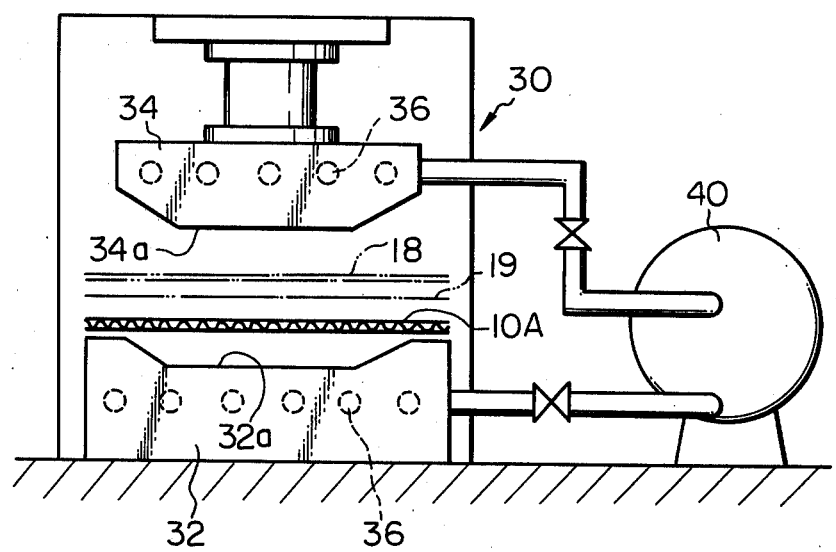
FIG. 3 is a schematic elevation of a hot-press used in a method of the invention.

FIG. 3 shows a hot-press 30 for use in the production of corrugated paperboard base trim boards such as is shown in FIG. 2. As is usual, the hot-press 30 has a stationary die 32 and a movable die 34. Heating pipes 36 are embedded in both the stationary and movable dies 32, 34, so that the dies 32, 34 can be heated to desired temperatures by passing an appropriately heated fluid through these pipes 36 from an external source 40.

In the case of shaping corrugated paperboard in advance of the application of the facing layer 18 thereto, a flat board 10A of corrugated paperboard is placed on the shaped face 32a(shaped as a female die in FIG. 3) of the heated stationary die 32 and then the heated movable die 34(which has a shaped face 34a as a male die) is lowered so as to press the board 10A against the die face 32a. Since heat is applied to the board 10A in this state, the thermoplastic resin layers 16 in the board 10A soften or fluidify. Accordingly the corrugated medium 12 and the liners 14 can make laterally relative displacements to certain extents in a slipping manner and are allowed to individually and differently be stretched or shrinked during the press-forming. Owing to this phenomenon, the flat corrugated paperboard 10A can be shaped into the partly curved board 10 without significantly wrinkling. The thermoplastic resin layers 16 again solidify upon temperature reduction after the press-forming, so that the shaped board 10 can retain its curved shape. Then the facing layer 18 is bonded onto one side of the shaped board 10 by means of either a separate hot-press or a vacuum molding apparatus.

In the case of simultaneously accomplishing the press-forming and the facing, a hot-melt sheet 19 such as a polyethylene film and the facing layer 18 are placed in this order on the flat board 10A of corrugated paperboard which is firstly placed on the heated stationary die 32. Then the heated movable die 34 is lowered so as to shape the piled materials 10A, 19 and 18 as a whole. As a result, the facing layer 18 is bonded to the corrugated paper board 10A by the function of the fluidified hot-melt 19 as an adhesive while the shaping of the corrugated paperboard 10A is accomplished by the aid of the softened or fluidified resin layers 16.

In either case, one side of the facing layer 18 may preliminarily be laid with a hot-melt layer in place of using the separate hot-melt sheet 19. When the facing layer 18 is a thermoplastic resin sheet, there will be no need of using any extra hot-melt sheet.

Unfortunately, some cracks as indicated at 24 in FIG. 1 tend to appear on one of the liners 14 of the thus shaped corrugated paperboard 10 particularly when the board 10 is considerably bulged or dented in a comparatively small area such as the area 20 in FIG. 1, although the use of a thermoplastic resin as the material of the adhesive layers 16 is effective to a certain extent for precluding such cracking. There is a strong probability of the appearance of the cracks 24 when the local bulging or denting of the board 10 involves a stretching of one of the liners 14 in a direction X—X parallel to the ridges of the corrugated medium 12. The paper liners 14 inherently lack ductility but can deform without cracking so long as the tension at the pressforming acts in a direction Y—Y which is defined as normal to the ridges of the corrugated medium 12(owing to the deformation of the ridges). When the tension acts in the direction X—X, the corrugated medium 12 cannot freely deform either but collapses under a certain magnitude of tension. Thereafter each liner 14 alone stands firm against an increasing tension but finally ruptures, meaning the appearance of the cracks 24.

According to the invention, a notching operation is performed on the flat board 10A prior to the above described press-forming operation as a preclusive measure to the cracking in the area 20 of the shaped board 10. In FIG. 4, an area 20' of the flat board 10A gives the bulged or dented area 20 of FIG. 1 when the board 10 is shaped. Within this area 20', a smaller area 21 is assumed such that, when the aperture 22 is formed for the hereinbefore described purpose, this area 21 is smaller(-narrower in every direction) than the area of the aperture 22 and is entirely included in the aperture 22. As a first step of making a linear notch 26 in this area 21 as shown in FIG. 5, two tiny holes 28 are made in this area 21 with a distance corresponding to the intended length of the notch 26 by means of a suitable implement such as a piercing punch 42 (FIG. 4). Then the notch 26 is made with a cutter blade 44 as a slim slot connecting the two holes 28(FIG. 5).

It is necessary that the notch 26 extends in a direction transversal to the direction X—X of the ridges of the corrugated medium 12 either exactly crosswise or obliquely. The notch 26 is made in one of the liners 14 which will undergo a larger extent of stretching in the area 20' at the subsequent press-forming operation than the other liner 14. The notch 26 has a depth larger than the thickness of the notched liner 14. The depth may be smaller than the total thickness of the notched liner 14 and the corrugated medium 12(the other liner 14 is left uncut) or reach the total thickness of the flat board 10A(the other liner 14 too is fully notched).

It is permissible to make two or more notches 26 in the area 21 according to the design of the bulged or dented area 20. In this case, various arrangements are adoptable for the notches so long as every notch is transversal to the direction X—X, i.e., the ridges of the corrugaged medium 12. For example, FIG. 6-a shows two parallel notches 26 which extend perpendicularly to the direction X—X, and FIG. 6-b shows an X-shaped arrangement of two notches 26. In FIG. 6-c, three notches 26 intersect each other at one point as if six shorter notches radially extend from this point.

The holes 28 have substantially the same depth as the notch 26 and a rounded (conveniently circular) periphery in plan view. The width of the holes 28 is not smaller than the width of the notch 26 on the surface of the liner 14.

After the above described notching procedures, the flat board 10A is shaped by the hereinbefore described press-forming operation. At the press-forming there occurs an enlargement in width of the notch 26 as tension acts on the corrugated paperboard 10A, particularly in the area 20', in a direction transversal to the direction Y—Y of the corrugation in the board 10A. Accordingly the notched liner 14 is allowed to deform also in a direction generally parallel to the direction X—X without firmly resisting against the tension. The bulging or denting of the board 10A in the area 20', therefore, can be achieved without causing cracks 24 in this area 20', i.e., the area 20 in the shaped board 10.

When tension acts on the notched liner 14, the presence of the notch 26 tends to cause the appearance of cracks starting at the ends of the notch in the manner of an extension of the linear notch 26. This tendency is so strong that the cracking will be realized if the ends of the notch 26 are sharp-pointed, or rugged and splintery. However, the presence of the holes 28 as the terminals of the notch 26 means that the notch 26 exhibits little directional effect with respect to cracking of the notched liner 14 and almost completely precludes the development of any crack from the ends of the notch 26.

The press-forming operation gives the shaped board 10 which has the notch 26 in a widened state as shown in FIG. 7. Then the bulged or dented area 20 is partly cut away to form the intended aperture 22. Since the notch 26 is present within the area 21 which is distinctly smaller than the area 20 and entirely contained in an area to be cut away, no trace is left in the shaped and apertured board 10. Even if cracks appear at the ends of the notch 26, i.e., the holes 28, the cracks develop only to such a small extent that the cracked regions can thoroughly be removed by the cutting operation for providing the aperture 22. (As described hereinbefore, the notch 26 is made within the area 21 which is entirely included in the area of the aperture 22.) The shape and apertured substrate 10, therefore, can always be obtained as a crackless board.

Thereafter the facing layer 18 is applied to the shaped board 10. If desired, however, the shaped board 10 may firstly be laid with the facing layer 18, followed by a cutting operation to form the aperture 22 in the laminated board.

The provision of the notch 26 is easy to practice and makes a great contribution to the prevention of cracking of the liners 14. In other words, a method of the invention is suitable for industrial application and can give corrugated paperboard base trim boards featuring good appearance and satisfactory physical strength.

What is claimed is:

1. A method of producing a corrugated paperboard substrate of a trim board for application to the interior of cars, ships or buildings, the substrate having an aperture formed in a relatively small locally bulged or dented area for the installation of a separate article, the method comprising the steps of:
    (a) making at least one linear notch in a flat board or corrugated paperboard to extend transversely to the ridges of the corrugated medium of said board in such a disposition that said at least one notch is entirely include in a relatively small area to subsequently be cut away to form said aperture;
    (b) press-forming the notched board into a desired shape to have a locally bulged or dented area which includes said small area; and
    (c) forming said aperture in said bulged or dented area of the shaped board, whereby said at least one notch is entirely removed from the shaped board.

2. A method as claimed in claim 1, wherein said at least one notch is formed by firstly making two tiny holes within said small area for each notch with a distance corresponding to an intended length of said each notch and then forming said each notch to connect said two holes and terminate at said two holes.

3. A method as claimed in claim 2, wherein said two holes have a circular periphery with a larger width than the width of the notch formed therebetween.

4. A method as claimed in claim 3, wherein the depth of said at least one notch is larger than the thickness of a liner of said flat board.

5. A method as claimed in claim 4, wherein the depth of said at least one notch reaches the total thickness of said flat board.

6. A method as claimed in claim 2, wherein said at least one notch consists of at least two separate and generally parallel notches extending generally normal to said ridges.

7. A method as claimed in claim 2, wherein said at least one notch consists of two intersecting notches both extending obliquely to said ridges.

8. A method as claimed in claim 2, wherein said at least one notch consists of at least three notches which intersect each other at one point.

9. A method as claimed in claim 2, wherein said corrugated paperboard is made up of a corrugated medium, at least one liner and a thermoplastic resin layer interposed between said corrugated medium and each liner as an adhesive layer, the step (b) being performed with application of heat to the notched board.

10. A method as claimed in claim 9, wherein said thermoplastic resin is polyethylene.

11. A method as claimed in claim 9, wherein said at least one liner consists of two liners each bonded by said thermoplastic resin layer to said corrugated medium.

* * * * *